Dec. 11, 1973  OLE-BENDT RASMUSSEN  3,778,333
MICROPLEATED COMPOSITE FIBROUS PRODUCT
Filed May 27, 1971  4 Sheets-Sheet 2

Dec. 11, 1973   OLE-BENDT RASMUSSEN   3,778,333
MICROPLEATED COMPOSITE FIBROUS PRODUCT
Filed May 27, 1971
4 Sheets-Sheet 3

United States Patent Office 3,778,333
Patented Dec. 11, 1973

3,778,333
MICROPLEATED COMPOSITE FIBROUS PRODUCT
Ole-Bendt Rasmussen, Copenhagen, Denmark
(7 Topstykket, 3460 Birkerod, Denmark)
Continuation-in-part of abandoned application Ser. No. 751,205, Aug. 8, 1968. This application May 27, 1971, Ser. No. 147,496
Claims priority, application Great Britain, Aug. 9, 1967, 36,531/67
Int. Cl. B32b 3/28, 5/02
U.S. Cl. 161—169
10 Claims

ABSTRACT OF THE DISCLOSURE

Filaments, fibres and fibre-like structures consisting of thin ribbon-like layers formed of different polymeric materials and transversely pleated with the spacing between adjacent pleats being up to about $100\mu$. To make an intermediate product, a sandwich-like structure having microscopically thin layers is simultaneously compressed in one direction in the plane of the layers and expanded perpendicularly thereto, also in the plane of the layers under conditions at which the materials of the layers are in states of different fluidity. The intermediate product is subjected to splitting action to form the final product.

This application is a continuation-in-part of parent application Ser. No. 751,205, filed Aug. 8, 1968, now abandoned.

BACKGROUND OF THE INVENTION

The present invention relates to bi- or multi-component staple fibres, filaments or fibre networks made from polymer materials.

It is to be understood that the term "fibres" as used herein also comprises structures, which in their geometrical shape are different from the conventional concept of fibres, but still in many respects behave substantially in the same way.

Fibres and filaments are known comprising interconnected strands of different components in order to obtain crimp through differential shrinkage, or to obtain a combination of different properties such as moisture transportability and dyeability resulting from a hydrophilic component in combination with wet strength and easy drying resulting from a hydrophobic component. However, the possibility of obtaining desired combinations is limited by the circumstance that components having substantially different properties will usually have a poor adherence to one another.

It is an object of the invention to provide bi- or multi-component fibres, filaments or fibre networks, in which the adhesion between the components is improved owing to a particular structure of the product. Other objects are to provide improved resilience and bulk.

SUMMARY OF THE INVENTION

According to the invention, there is provided a filament, staple fibre or fibre network in form of a composite assembly of one or more thin elongated ribbon-like and micropleated layers of a film-forming polymeric material, and adhesively joined herewith in face-to-face relationship one or more layers of material comprising a polymer capable of being formed into filaments.

By a micro-pleated configuration is to be understood one in which the spacing of the pleats is up to about $100\mu$. Normally, this spacing will be $10-30\mu$, and it may amount to just a few $\mu$.

The pleated configuration of said layers produces a more intimate contact between the latter so that an improved adherence is obtained.

Said ribbon-like micro-pleated layer of the film-forming polymeric material, hereinafter called the first material, should have at least two and preferably a higher number of pleats.

In the final fibre or filament, the layer or layers of material comprising a polymer capable of being formed into filaments, hereinafter called the second material, may also form micro-pleated layer(s), which will then be nested into the pleated layer(s) of the first material, whereby the fibre or filament as a whole will generally also be micro-pleated in cross-section. However, in some cases the external face of the final filament or fibre may be generally flat, viz. when the second material fills the "valleys" in the first material at these faces, but is absent on the corresponding ridges or form only a very thin layer on these ridges. There is obtained a significant improvement in springiness and bulk in case the fibre or filament as a whole has micro-pleated cross-shape.

The increase of bulk thus obtained, as contrasted to that resulting from a crimped configuration along the length of the fibres—which may of course also be present in a product according to the invention—will not decrease significantly when the fibrous product is subjected to such longitudinal tensions as normally occur in use.

It should be understood that the invention applies not only to thermoplastic polymers, but also to other polymers, which are capable of being shaped in said sandwich-like arrangement, e.g. cross-linked polymers polymerized in situ or polymers which decompose below their melting point, but are capable of forming a homogeneous film from dispersion or solution.

It is mentioned above that the product according to the invention can be in form of a fibre network. More exactly described, this means a yarn or web in form of a network of fibre-like elements in branching-off relationship to one another, as well-known in the art of fibrillating films, e.g. by means of needle rollers.

The layers of first and second material may either be in direct adhesive contact with one another, or there may be provided one or several intermediate layers of an adhesive component. They may, e.g. consist of graft- or block copolymers between the principal polymers forming the first and second material, or may in many cases simply be a blend of the first and second material optionally with addition of a so called alloying component.

The first and second material need not be chemically different but may be chemically identical provided that they have been manufactured in such a way as to have different physical properties. E.g. the filamentary strands may be in the form of micro-fibrils, while the pleated strips are in the form of a continuous structure of a substance, chemically identical with the first material, as will be explained further below.

The above-mentioned fibrous product can be produced by a method which is claimed in my copending application No. 75,229. This method comprises the steps of forming a sandwich-like product consisting of alternating substantially parallel microscopically thin layers of at least two generally polymeric materials, subjecting said product to a simultaneous compression in one direction substantially in the plane of said layers, and expansion perpendicularly thereto also in the plane of said layers under conditions at which the materials are in states of different fluidity.

A further step consists in disrupting the continuous connection between the layers of one of said materials formed by the layers of at least one other of said materials, whereby the fibrous character is developed.

At the stage just before compression and expansion, the sandwich-like product can either be a relatively thick filament or a flat structure such as a ribbon or a relatively wide sheet which may be tubular. The layers may be parallel or practically parallel to the flat dimension of the product or may traverse over a part of the thickness of the product or the whole thickness of the product and may even be perpendicular to the flat dimension of the product.

As a result of the combined compression and expansion, the product will become internally pleated, i.e. the distance between two adjacent pleats in a layer will be smaller than the thickness of the product. In this connection the aim of carrying out the expansion simultaneously with the compression is to introduce a stress which serves to regulate the pleating.

The sandwich-like product consisting of alternating layers of at least two materials may be produced by extruding alternating layers of said materials. It is generally most practical to extrude a multitude of the layers into a common chamber where they unite. Extruder heads for simultaneous extrusion and lamination of two or a small number of layers of different polymeric materials have since long been used for the production of composite packaging film materials. Similar dies but constructed for simultaneous extrusion of a great number of layers are suitable for carrying out the method according to the invention.

However, the sandwich-like product can also be produced by forming films from solutions or dispersion of suitable polymers and uniting said films to form said sandwich-like product. Furthermore, the forming of said sandwich-like product can be effected by successively casting films or flakes on a roller or belt by melt extrusion or by applying substances polymerizing in situ onto such roller or belt.

A particularly suitable manner of forming the sandwich-like product consists in feeding a fluid first extrudable material to first orifices in a circular row comprising a multitude of such orifices in an extruding device, feeding a fluid second extrudable material to second orifices in the row, said first orifices and said second orifices being interspersed with each other, extruding the fluid materials through the orifices into an annular collecting chamber that extends along the length of the circular row and rotating one side of the collecting chamber relative to the other thereby dragging out the sides of the extruded lamellae to substantially reduce their thickness while they advance in the direction of extrusion. It is also possible to extrude more than two different materials in similar manner.

By the rotation of one side of the collecting chamber relative to the other each of the lamellae is drawn or sheared out laterally until they form the desired sandwich-like arrangement, in which the layers are at a very small angle to the surface of the product. A tendency for higher shearing-out near the surfaces than in the central part of the tubular product can to some extent be counteracted by forming said orifices in such manner that each of them extrude less material in the central part than near the surfaces.

When producing the sandwich-like product in an extruder head common for two or more components, each fed through an individual extruder, it is generally preferable that the layers while still in molten state are divided to strips consisting of narrow laminated ribbons or elongated flakes by passage through a grid of said extruder head.

If the material in film-form is to be subjected to the compression after termination of the full extrusion process, it is preferable to unite the sandwich-like strips leaving said grid so as to form a tubular structure. The sandwich-like strips may be united during the transversal shearing produced by continuously rotating the two lips of a last section of a ring die in opposite directions.

If the sandwich-like product is formed by the shearing-out of materials from a multiude of orifices as described above, and if the said grid is steady in relation to said row of orifices, the grid will divide each layer into continuous thin ribbon-structures, whereas discontinuous ribbons will be formed if the grid rotates relative to the row of orifices. Such product consisting of discontinuous ribbons is suitable for the production of staple fibes according to the invention.

The sandwich-like product may also be formed by extruding the first polymeric material through filament-forming protruding nozzles in a chamber of an extruder head and the second polymeric material through orifices between said protruding nozzles and by uniting the streams extruded in said chamber, the filaments of the first polymeric materials being either extruded flat or subsequently flattened.

In practice, the simultaneous compression and expansion can be carried out in different ways, generally while both or all materials are maintained in a molten or semi-molten state and thus easy to deform. Thus, it can be effected by rolling of a sheet product in which the layers are perpendicular to the flat dimension or by stretching of the same over a sharp edge, or by rolling of a finely externally pleated sheet material in which the layers are parallel or nearly parallel to the flat dimension of the product. When the temperature etc. during the rolling is adapted to convert such a corrugated sheet to a flat form, then the external pleats will be converted to internal pleating.

However, the easiest way of forming the micropleats generally is to carry out the step of compression and simultaneous expansion in connection with the extrusion of the sandwich-like product during passage through a chamber with gradually varying dimensions.

If the compression and simultaneous expansion is carried out while both materials are in a truly molten state, the ratio between the melt viscosities of the two materials should preferably be in the range between about 2:1 and 20:1 at the temperature, at which said information takes place. If the ratio is lower, the pleats will generally not become as deep as desirable, and if the ratio is higher the structure may become too irregular and the spacing between the pleats too big.

The micro-pleating caused by the compression will of course result in some irregularity of the thickness within a cross-section of each of the layers, no matter whether the compression and expansion take place in fluid or semifluid or in a more solid state. In this connection the most fluid material will tend to adapt its shape to the deformations which the less fluid material tends to determine, thus said irregularities of thickness will be most pronounced in the layers formed by the more fluid material. These irregularities increase the splittability of the individual layers. Thus the material which is intended to retain the highest resistance to splitting is generally chosen to have the lowest fluidity at the temperature where the compression and expansion are carried out.

The process step of disruption can also be carried out in different ways, some being particularly cheap and some being directed particularly to the creation of suitable fibre surface properties. In any case, the treatment must be so chosen in relation to the materials that at least one of the materials retains a continuous or practically continuous structure within the areas which are sufficiently big for still exhibiting the micro-pleated configuration. The disruption generally involves a mechanical treatment which either spits the structure of one of the materials or makes the interphases between the lamellae slip. Additionally to or in some cases independently of the mechanical disruption leaching out of a part of the product may be applied. Furthermore, the mechanical disruption either in the interphases or internally in one of the materials can with great advantage be promoted by including in one of the materials a slipping agent, for instance an oil which is soluble in the material while this is melted or semimelted, but bleeds out when the latter solidifies. Alternative or supplementary agents to aid the disruption are swelling agents and expansion agents, such a volatile solvents which are preferably applied to the product after extrusion, micro-pleating and solidification of the product. Mechanical treatments suitable for the disruption are in particular rubbing, but also twisting, drawing, rolling, impacting, bending, brushing or acoustic splitting actions.

As mentioned in connection with the description of the fibre or filament product, the pleated strips or the filamentary strands may be laminated with an adhesive layer in between. In this case, the disruption treatment generally should be so chosen that said adhesive bond is substantially unaffected, whereas the disruption may for instance take place in the second material or by means of a fourth material also forming part of the sandwich-structure. Said fourth material which is used particularly with a view to an easy production of fibres, filaments or fibre networks from the intermediate product, may or may not be present in the final product. It may be a material which can easily be dissolved out of the product, or which can easily be fractured or brought to slip apart from one or both adjacent components. Examples of materials which can easily be dissolved out of the product are polyethyleneoxide, which is water soluble, and polyethylene, which may be removed by means of a variety of organic solvents at elevated temperature, provided that the components which should remain in the final product are so selected that they do not dissolve in said solvent.

If the layers are not formed as continuous or discontinuous ribbon-like structures, during the extrusion process and prior to the step of micro-pleating, but still form relatively wide films, then a splitting of the micro-pleated layers of the first material is necessary either by a cutting action such as by means of needle rollers or series of knives, or by means of the mechanical disruption actions described above. In the last-mentioned case there must be established a suitable balance between the splittability in the pleated layers of the first material and the disruptability of the layers of the first material from one another in order to maintain a pleated configuration. For the production of yarn to is generally preferable to form the ribbon-like structures in the extrusion process prior to the micro-pleating, whereas the splitting after micro-pleating generally is preferable for production of net-formed webs for non-woven fabrics.

If the ribbon-like structures are formed in the extrusion process or by a cutting action it is generally preferable to use a split resistant polymeric material as the first material. The reason for this choice is partly that it enables vigorous disrupting forces to be applied without risk of ruining the pleated configuration, but also and particularly that otherwise the pleated configuration will be prone to abrasion during the use of the fibrous product. Examples of suitable split-resistant polymers are: polyamides, polyesters, block copolymers of alternate crystalline and elastomer segments, graft copolymers having an elastomer backbone and crystalline grafts.

The fibre, filament or fibre network according to the invention may with advantage consist, as the second component, of one or several layers of a polymer material which have a disrupted substructure in the final product, and as the first component of one or several micro-pleated layers of a polymer material which have, in essence, a geometrically continuous—or in other words solid and non-fibrillated substructure—in the final product. The two materials must still be adhesively joined, and thus it may be necessary to make use of intermediate adhesive layer(s). The subdivided layer(s) which preferably consist of micro-fibrillated formations disrupted from one another, provide a high surface area which, dependent on the choice of polymers, increases different absorption properties, e.g., water take-up and dyeability. The layer(s) of continuous structure act as carriers or supports for the disrupted layer(s) in providing tensile strength and resilience. Their micro-pleated cross-section are important for the springiness of the final product upon bending and further increase the abrasion resistance of the assembly.

Said disruption of the second component can, in fact, be produced by mechanical fibrillation alone, provided the first component is especially split-resistant (as most polyamides are) and the second component is especially fragile, at least after orientation. However, the effect can be made more pronounced by suitable physical-chemical means of disruption. Thus, the micro-fibrillar formations may be formed from crystalline polymers when an oil is dissolved in the latter in melted state and bleeds out during the crystallization. The oil can subsequently be leached out.

Such a microfibrillar structure is generally produced in its most pronounced form by use of a molten very fine polymer-in-polymer dispersion, one of the components in said dispersion being subsequently leached out, at least in part. The microfibrillar structures in such disrupted material may advantageously be crystal formations as disclosed in other connection in Pat. No. 3,499,822.

The external faces of the final filament or fibre may be generally flat, viz. when the disrupted second material described above fills the "valleys" of the micro-pleated layer(s) of first material, but is absent on the ridges of said layer(s) or forms only a very thin cover on said ridges. In this manner the ridges of the split-resistant material protect the sub-divided material from abrasion. However, if more emphasis is put on the bulk of the fibre, then the fibre or filament containing subdivided material should, as a whole, exhibit a pronouncedly micro-pleated cross-shape. This is best obtained by use of an extra set of layers for separating purposes, as described above.

It is emphasized that the invention is not restricted to combinations of layer(s) of disrupted substructure and layer(s) of continuous structure, as said disrupted substructure is only desirable when a particular absorbance is required, and an embodiment of the present invention is characterized in that either the first or the second material is a polyamide and the other a polyester, both with generally continuous substructure. Thus both constituents will exhibit high abrasion resistance, and a differential shrinkage due to the different moisture absorbance gives high curling effect. Furthermore, the polyester contributes with high crease resistance whereas the polyamide contributes with relatively high dyeability. The polyester can with advantage be polyethyleneterephthalate and the polyamide either polycaprolactam or polyhexamethyleneadipamide. An adhesive component will generally be necessary for these combinations.

In another embodiment of the present invention, the first material is either a polyamide or a polyester and the second material is a polyolefin present in higher amounts than the polyamide or polyester. The cheap polyolefinic material hereby mainly acts as a filler whereas the polyamide or polyester provides the desired abrasion resistance. Also in these cases an adhesive component will generally be necessary.

DESCRIPTION OF THE PREFERRED EMBODIMENT

Figure 1:
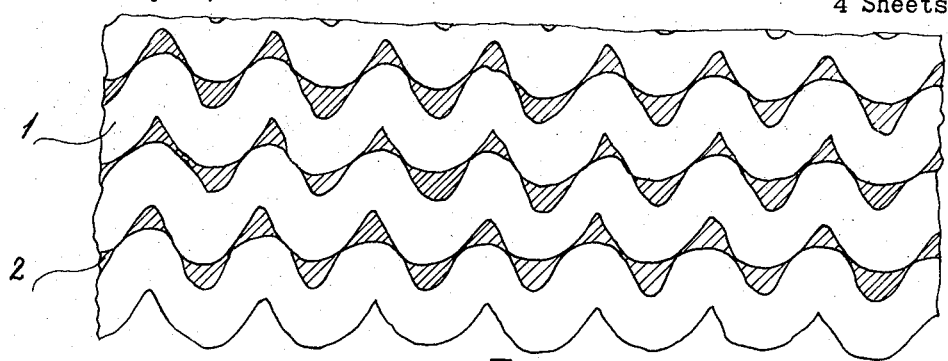
FIGS. 1 to 5 show cross-sections, in high magnification, of different intermediate products for manufacture of fibres, filaments or fibre networks according to the invention.

In the intermediate sheet product shown in FIG. 1 the layers of first component 1 and second component 2 are generally parallel to the surfaces of the sheet. The drawing only shows a portion of the thickness, and there should generally be about 10 to 100 layers of each component. The assembly is produced by co-extrusion (see the description in connection with FIGS. 10, 11 and 12) or by successive casting of layers on a belt. The micro-pleating is produced after solidification of the sheet by means of the stretching and compression devices of FIG. 8 and/or FIG. 9. The drawing shows the configuration resulting when 1 is less fluid than 2 during the compression step which forms the pleats. Hereby 2 is "squeezed" into the valleys of 1 and gets a varying thickness, principally as shown. For the sake of clarity this effect is exaggerated in the drawing.

The first component 1 is split resistant while the second component 2 is disruptible. Fibres, filaments or fibre networks are produced by splitting transversely to the layer structure by means of needle rollers or the like and cleaving of the layers 2. To obtain a suitable end product, the two components must form an adhesive bonding with each other, but due to the nesting effect, the requirement for adhesive bonding is much less than normally.

Figure 2:
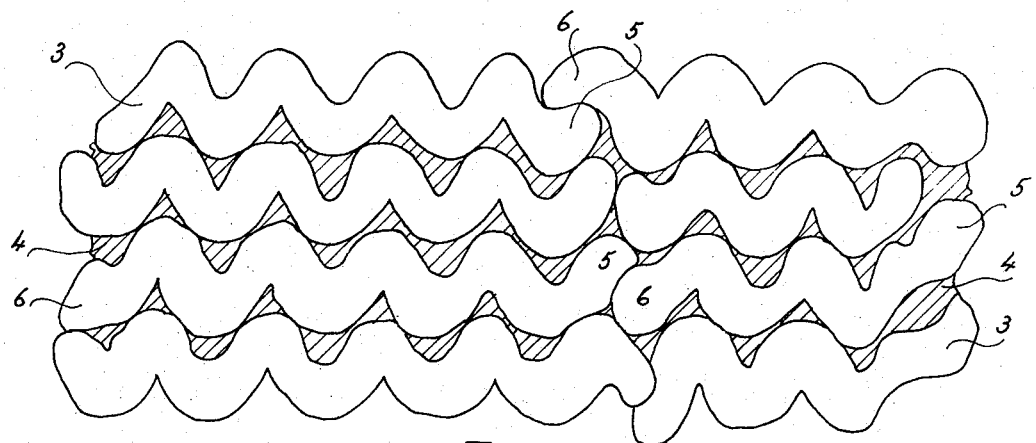
Figure 13:
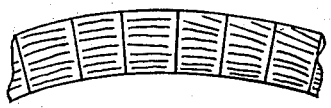
Figure 14:

FIG. 2 shows a similar sheet as FIG. 1 produced by co-extrusion, but the layers of the first component 3 have already received a ribbon-like structure in the extrusion die. The right and left edges are marked 5 and 6 respectively. The longitudinal direction of the ribbons is perpendicular to the view plane. Between the layers of first component are the layers of second component 4. This co-extrusion is carried out as described in connection with FIGS. 13 and 14. A similar structure, but with the second component interspersed also between 5 and 6, is produced by the method described in connection with FIGS. 16 and 17.

Figure 3:
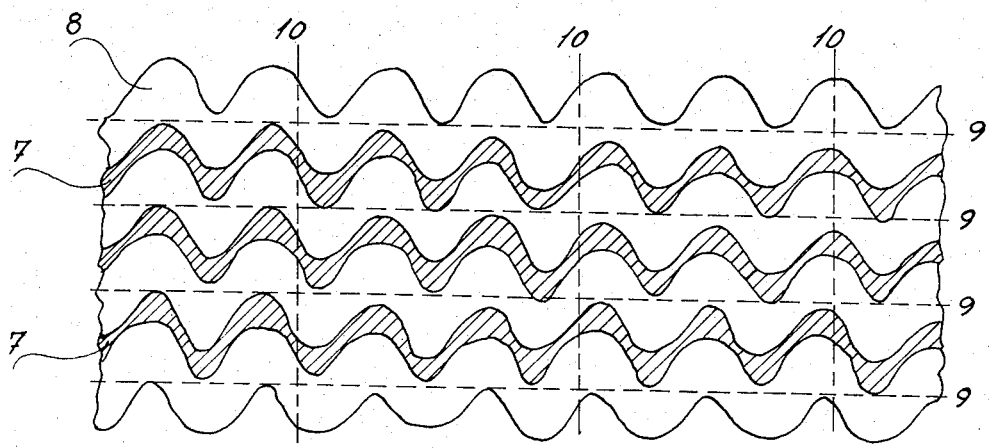

FIG. 3 is similar to FIG. 1 but represents a more normal cross-section of those layers 7 which have been most fluid during the step of compression and pleating. It still appears that the material 7 has been squeezed towards the valleys of the less fluid material 8, but not so pronouncedly as shown in FIGS. 1 and 2. Independently of this feature, FIG. 3 further illustrates the production of a highly absorbent fibre consisting of a micro-pleated carrier layer 7 which has a continuous substructure and layers having a disrupted substructure 8. Using the terms of the foregoing description 7 will be the first component and 8 the second component. 7 is a split resistant polymer, while 8 is a blend of two incompatible polymers. By means of needle rollers or knives, the product is split perpendicular to the view plane as indicated by lines 10, and by flexing and/or rubbing the fragile second component 9 is cleaved, also perpendicular to the view plane, as indicated by the lines 9. (Although not shown in the drawing, this cleaving will usually form a rather irregular surface.) Finally, one of the constituents in the layers 8 is dissolved out to form the disrupted substructure. The micro-pleated profile of the carrier layer 7 is important both for the resilience of the composite fibre and to protect the micro-fibrous material 8 against abrasion.

Figure 4:
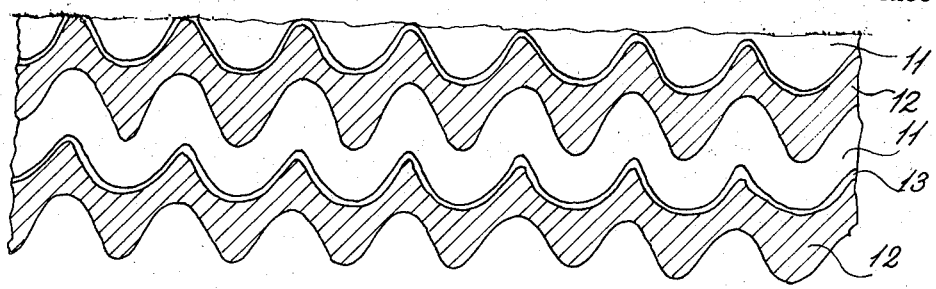

FIG. 4 is also similar to FIG. 1, but between every other layer of first component 11 and second component 12 there is a layer 13 of an auxiliary component. This can either be an adhesive component or separating component.

If 11 and 12 are pronouncedly incompatible polymers, an adhesive component will be needed to obtain sufficient bonding in the final product. In this case, the intermediate product will generally, when subjected to rubbing and/or flexing, cleave at the interfaces where 11 and 12 contact each other directly, and the final fibre or filament will get the shape shown in FIG. 7.

In other cases there is more need for a separating component which facilitates the cleaving, and it is often preferable to intersperse an adhesive layer at one side of the first component and a separating component at the other side.

Figure 5:
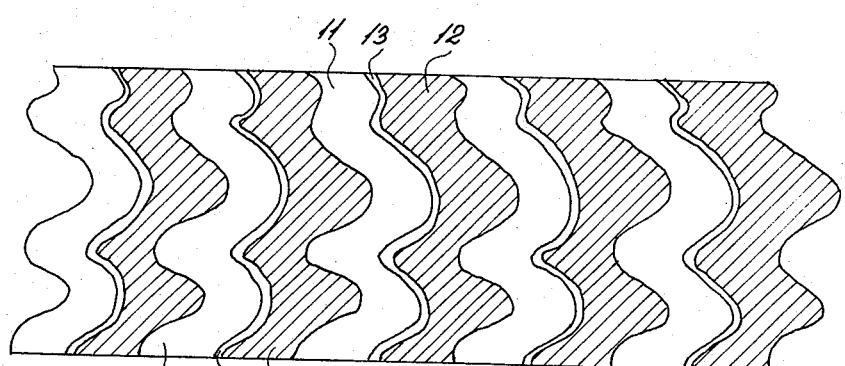

FIG. 5 represents an intermediate sheet structure where the layers have been generally perpendicular to the sheet-surface prior to the pleating (compression), and the latter has been carried out by reduction of the sheet thickness. This generally is the easiest way to produce the micro-pleating but makes the latter less even, as indicated in the drawing. A structure of this kind results from the method described in connection with FIG. 15.

Figures 6, 7:
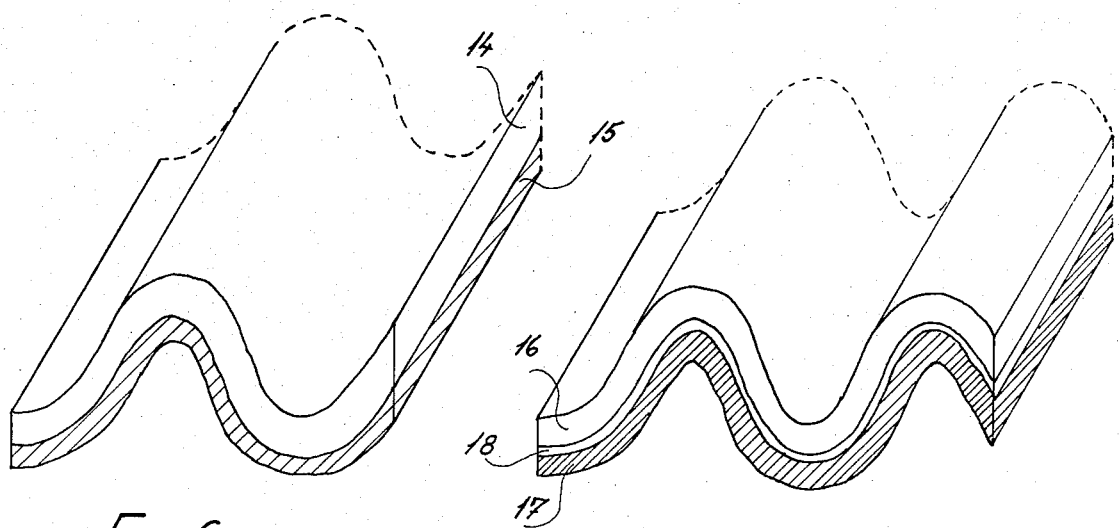
FIGS. 6 and 7 show a perspective and cross-sectional view of two different multi-component bulked fibres or filaments according to the invention.

The fibre or filament shown in FIG. 6 consists of two layers 14 and 15, of different components which bond adhesively to each other, although the requirement for adhesion is less than normal. The fibre as a whole has a micro-pleated profile which improves the resilience. The fibre is produced either from the intermediate product shown in FIG. 4, or from that shown in FIG. 5, the layers 13 being then a separating component. This can either be totally removed, or form separate mono-layer zbres, or remain as traces on the surfaces of the bicomponent fibre (not shown in FIG. 6).

FIG. 7 shows a similar fibre, but produced from layers of two incompatible polymers 16 and 17 under use of an intervening adhesive layer 18.

Figure 8:
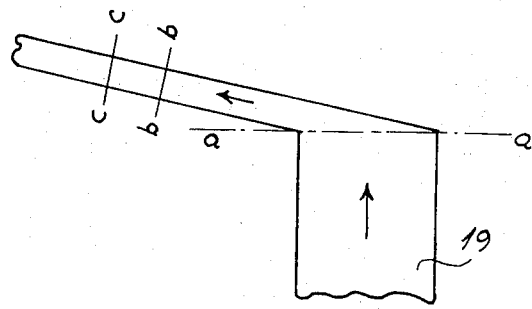
FIG. 8 is a schematic illustration of a stretching bench suitable for orienting and compressing a sandwich-like product by the method according to the invention.

The stretching device shown in FIG. 8 comprises a first set of rubber-coated nip-rollers, the nip zone of which is indicated by the line a—a. It also comprises a second and a third set of nip-rollers, the nip zones of which being indicated by the lines b—b and c—c, respectively. A continuous sheet 19 with a sandwich-like structure as shown in FIGS. 1, 2, 3, and 4 is fed into the nip zone of the first set of nip-rollers in a direction perpendicular to the axis of the rollers and is drawn off by the second set of rollers in a direction almost perpendicular to the feeding direction (see the arrows). Simultaneously with said change of direction the ribbon is strongly stretched in its longitudinal direction, the peripheral speed of the second set of rollers being chosen several times higher than that of the first set of rollers. Owing to said strong longitudinal drawing in combination with the extra narrowing resulting from the change of direction, a tension is produced which is capable of imparting to the ribbon relatively fine external longitudinal pleats which pleats are converted to internal pleating, when the ribbons subsequently pass the second set of rollers. In order to obtain said pleating the ribbon should not be too thin and generally not below 100μ during the feeding into the device. The third set of nip-rollers driven so as to produce a small further elongation serves to maintain a high longitudinal tension in the ribbon during the full passage between the second set of rollers. The device shown preferably also comprises a hot-air oven (not shown) located immediately before the first set of rollers, heating elements provided within said first set of rollers and a second hot-air oven located between the zones a—a and b—b. The device may also comprise a cooling device located between the zones b—b and c—c.

If the change of direction is α, the ratio of reduction of width will be sine (90°−α). The sandwich-like product stretched at a ratio $n$ will exhibit a tendency to obtain a reduction of width of a ratio about $1:\sqrt{n}$ as it tends to obtain about equal reductions of width and thickness when it is stretched $n$ times whereas the volume of the product is kept practically constant. Thus in order to obtain the intended internal pleating, sine (90°−α) must be significantly smaller than $1:\sqrt{n}$. In practice the change of direction should preferably be chosen so that sine (90° −α) will be between $1:\sqrt{n}$ and $1:3\sqrt{n}$.

Figure 9:
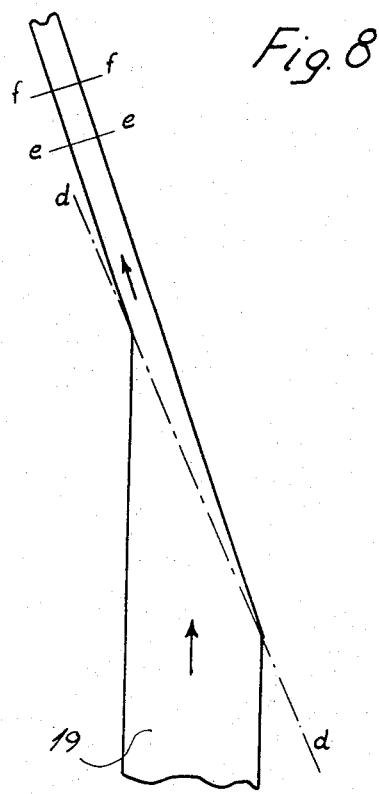
FIG. 9 is a schematic illustration of another stretching bench for use in the method according to the invention.

The sheet compressed and stretched in the device shown in FIG. 8 is preferably further treated in a device shown in FIG. 9. This device comprises a first set of rollers having a nip zone indicated by the line d—d, a second set of rollers indicated by the line e—e and a third set of nip-rollers indicated by the line f—f. The sheet material to be compressed and expanded is fed into the zone between the first set of nip-rollers under an angle to the nip zone and is drawn off by means of the second set of nip-rollers. In order to enable the feed under an angle, the first set of nip-rollers each consists of sections which are guided to slide in the longtiudinal direction of the roller by reciprocative movement synchronized with the rotation, as described in British patent specification No. 1,078,-732. During the passage through the device shown in FIG. 9, a previously oriented sheet can become laterally compressed with only a small further longitudinal stretching being necessary. By said treatment, the pleats produced become deeper. Generally, it is not desirable to produce the full depth of said pleats in one stage, and generally it is not desirable to use two devices of the type shown in FIG. 8 arranged in succession. It should be understood that in the arrangement of FIG. 9, like in that of FIG. 8, an external pleating occurs between the first set of rollers d—d and the second set of rollers e—e, whereafter the external pleats are converted to internal pleats by the passage through the rollers e—e.

Figure 11:
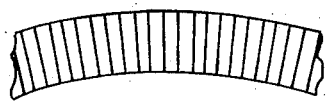
FIGS. 11, 12, 13 and 14 are schematic illustrations of various steps during the extrusion of a sandwich-like intermediate product by means of the extruder head shown in FIG. 10.
Figure 12:
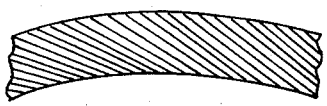
Figure 10:
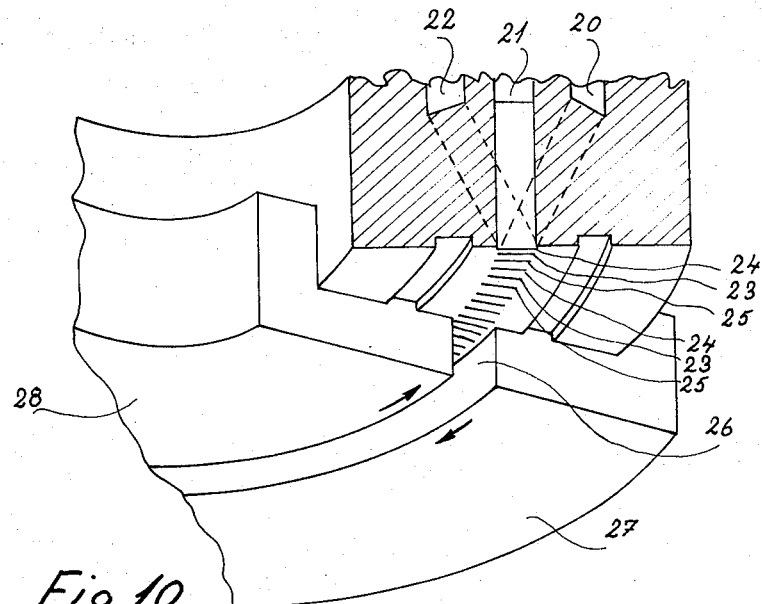
FIG. 10 is a partly sectional view of a mechanically driven extruder head for producing a sandwich-like intermediate product.

The extruder head shown in FIG. 10 is suitable for producing the sandwich-structure which is an intermediate product for the manufacture of fibres. It comprises three annular ducts 20, 21 and 22 which are arranged in repetitive sequence in a circular row, fed from three different extruders and communicating with extrusion slots 23, 24 and 25, respectively. The three sets of orifices are used to extrude and join the first and second components and an adhesive or separating component. An extrusion chamber 26 formed of two parts 27 and 28 which can be rotated around a common axis in opposite directions as shown by arrows, is located along the length of the circular row of extrusion slots. The radially arranged lamellae produced by the slots 23, 24 and 25, cf. FIG. 11, are subjected to a shearing action during the passage between the oppositely rotating walls of the chamber 26. This shearing action causes the lamellae to be drawn out so as to get the form schematically shown in FIG. 12 (but in actual fact the layers are almost concentrical). The layers thus formed may be divided into very narrow ribbons by means of a row of radial wire or thin blades provided in the path of the extruded tube (not shown in FIG. 10). In this case, the product will get the form shown in FIG. 13. If the material thus formed is subjected to a further shearing action although less vigorous than the first shearing treatment, it will get the form shown in FIG. 14. The reason for subjecting the material to this further treatment is to make the structure sufficiently coherent in sheet form to be capable of being treated on the stretching devices shown in FIGS. 8 and 9. This extruder head can easily be modified to co-extrude four or five materials instead of three materials or two materials only, when that is desirable. The division by means of wires or the like may be omitted, the layer-formed material being then directly extruded in tubular form preferably through an annular exit slot which reduces the thickness.

Figure 15:
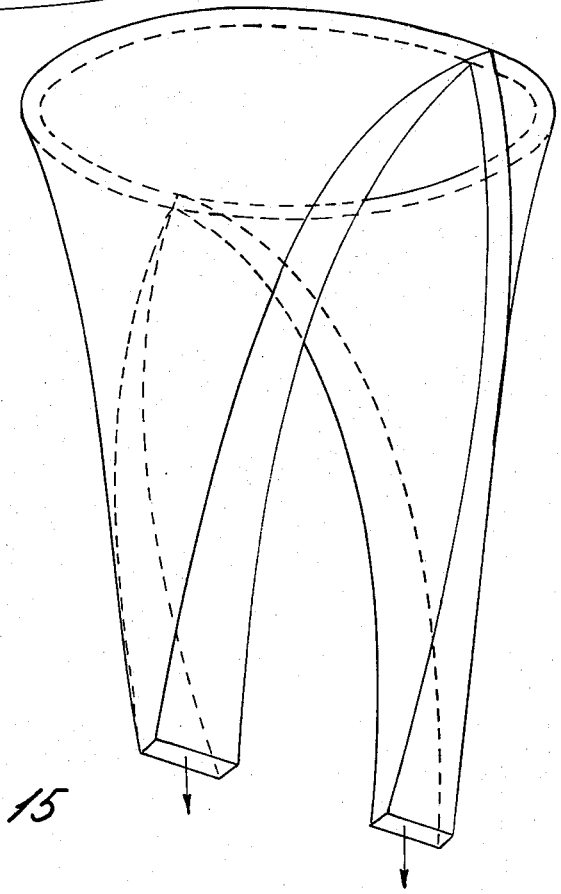
FIG. 15 is a schematic illustration of a method of compressing a sandwich-like intermediate product by passage through a zone in an extruder head which gradually changes the dimension of thickness into width and vice versa. The body shown represents the flow of molten material in the extruder die and neither shows the layer structure nor the die parts.

FIG. 15 illustrates a method of compressing (micro-pleating) a sheet-like product by passage through two chambers in an extruder head which gradually changes the dimensions of the cross-section. For the sake of clarity, the figure only shows the shape of the melted material inside the chambers instead of showing the chambers per se. One end of each chamber which is to be mounted in direct communication with the device shown in FIG. 10 is half-ring-shaped except for a small grid of radial wires (or thin blades) for dividing the layers into narrow lamellae. The width of each chamber gradually decreases and its thickness increases from one end of the chamber to the opposite end so that the dimension of width becomes thickness and vice versa. The increase of the width, however, is not strictly necessary for obtaining the effect of internal pleating. Furthermore, the grid can be omitted if use is made of a rather great number of relatively small chambers to produce the internal pleating. This method of compression produces the intermediate product shown in FIG. 5.

Figure 17:
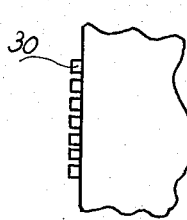
FIG. 17 is a cross-sectional view along the line marked with arrows in FIG. 16.
Figure 16:
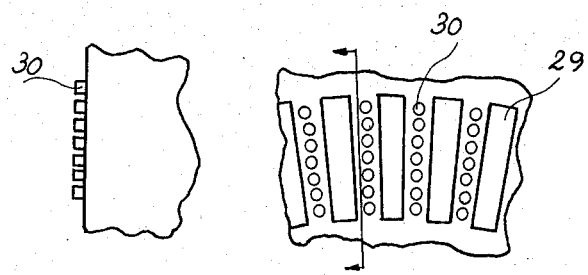
FIG. 16 shows a modification of the extrusion orifices shown in FIG. 10.

The extrusion device shown in FIGS. 16 and 17 comprises extrusion slots 29 and protruding extrusion nozzles 30 which are capable of forming filaments of a polymeric material which will be embedded in a matrix of polymeric material extruded through the slots 29. It is to be understood that the remaining part of the device corresponds to that shown in FIG. 10, and that the filaments are flattened by means of the rotating members 27 and 28 shown in FIG. 10.

EXAMPLE 1

Polypropylene toughened by block copolymerization with elastomeric segments of ethylene/propylene and having a melt index of 0.3 (ASTM D1238–57, condition L), and a copolymer of 71% ethylene and 29% vinylacetate having a melt index of 5 (same test method, but condition E) in a ratio of 65:35 are extruded in the extrusion die shown in FIG. 10 which, however, is modified to extrude only two components and is provided with a row of 20 compression chambers, each on principle as shown in FIG. 15. The length of slots 23 and 25 is 6 mm. (24 being omitted) and the chamber 26 has also a spacing of 6 mm. The inlet width of each of the chambers for internal pleating (the compresion chambers) is 20 mm., while the outlet cross-sectional dimensions of these chambers are 12 mm. x 2 mm. The 20 extruded strips of lamellar configuration are drawn down hot into a water bath at a draw-down ratio of about 1:20 and is thereafter oriented at 120° C. at draw ratio 1:5. Each strip is then swollen with chloroform and caused to expand by passage through boiling water. Finally the strip is split to individual filaments by rubbing between rubber plates.

EXAMPLE 2

Polycaprolactam of a melt index of 3 (ASTM D1238–57, condition K) and polyethylene (melt index 7, condition E) are extruded at 260° C. in a proportion of 40:60 by the method described in Example 1. The product thus formed is then oriented at 120° C. at a draw ratio of 2.5:1. The structure is disrupted to split fibre network by flexing and rubbing.

EXAMPLE 3

This example illustrates the production of composite fibres consisting of a mass of coherent extremely fine fibrils nested in a micro-pleated carrier layer.

The first component (for the carrier) is polycaprolactam of melt index 1.5 (ASTM D1238–57, condition K).

The second component (for the fibrils) is an intimate 50/50 blend of polycaprolactam and polyethylene-oxide both of melt index 6 according to the same specification.

The two components are co-extruded as described in Example 1, the proportion between first and second component being 1:2, and the extrusion temperature being 260° C. After orienting at a ratio of 1:3 the extruded strips are initially disrupted to a network by flexing and rubbing, then the polyethylene oxide is dissolved out with water, and after drying the network is further split by rubbing and is cut to staple fibres.

EXAMPLE 4

This example illustrates the production of fibres shaped as in FIG. 6. The first component is polycaprolactam of melt index 1.0 (ASTM D1238–57, condition K).

The second component is a hydrophilic, but not water soluble copolymer between polycaprolactam and polyhexamethyleneadipamide, usually called nylon 6A. Melt index 3.5 according to the same specification.

There is further used, as separating component, polyethyleneoxide of melt index 2.

The components are extruded from three extruders in the proportions 45% first component, 45% second component and 10% separating component. The extrusion die for creation of the layer-structure is as in Example 1, but for three components (see FIG. 10). The extrusion temperature is 260° C., the draw-down ratios 1:20 before crystallization and 1:3 at about room temperature. The extruded and oriented strips are initially split by rubbing and flexing, then the polyethyleneoxide is dissolved in water, and finally the material is split through by rubbing.

EXAMPLE 5

This example illustrates the production of fibres shaped as in FIG. 7.

The first component is polycaprolactam of melt index 1.0 (ASTM D1238–57, condition K)

The second component is polypropylene of melt index 4 (same specification).

The adhesive component is a copolymer of ethylene and zincacrylate, trade name Surlyn Z. Melt index: 1.5 (same specification).

There is further used polyethyleneoxide as separating component. The components are extruded from 4 extruders in the proportions 40% first component, 40% second component, 10% adhesive component and 10% separating component. The extrusion die for creation of the layer structure is as in Example 1, but for four components. The extrusion temperature is 260° C., the draw-down ratios 1:20 before crystallization and 1:3 at 120° C. The extruded and oriented strips are initially split by rubbing and flexing, then the polyethyleneoxide is dissolved in water, and finally the material is split through by rubbing.

I claim:

1. A sheet or strip product comprising a laminated assembly of a plurality of thin closely spaced micropleated films of a film-forming polymeric material, the ridges and valleys of said pleats extending generally longitudinally of the assembly with the spacing between adjacent pleats in a given film being up to about 100µ, said micropleated films being arranged in alternation with layers of material comprising a polymer capable of being formed into filaments.

2. A product as in claim 1 wherein said filament-forming polymer layers are compressed into substantially nested relation with said micropleated strips.

3. The product of claim 1 wherein each of said micropleated layers is adhered to at least one of said layers of filament-forming polymer through an intervening layer of an adhesive material.

4. The product of claim 1 wherein said film-forming first polymeric material is resistant to fibrillation and said filament-forming second polymeric material is susceptible to fibrillation.

5. The product of claim 1 wherein said overall assembly is mechanically disrupted to form a generally open net-like structure.

6. A multi-component continuous filament or staple fibre comprising a composite assembly of a plurality of thin elongated ribbon-like layers formed of different polymeric materials disposed in contacting adhering relation, said assembly being transversely pleated into at least two pleats having their ridges and valleys extending lengthwise of the filament or fibre with the spacing between adjacent pleats being up to about 100µ.

7. A web in form of a network of fibre-like elements in interconnected relationship, said fibre-like elements comprising a composite assembly of a plurality of thin elongated ribbon-like layers formed of different polymeric materials disposed in contacting adhering relation, said assembly being transversely pleated into at least two pleats having their ridges and valleys extending length-wise of the filament with the spacing between adjacent pleats being up to about 100µ.

8. A product according to claim 6 wherein the layers of one of said material are in a generally disrupted condition and the layers of another material are in a generally substantially continuous condition.

9. A product according to claim 7 wherein the layers of one of said material are in a generally disrupted condition and the layers of another material are in a generally substantially continuous condition.

10. A composite fibre or filament in the form of an assembly of layers in adhesive contact with one another, comprising at least one thin elongated ribbon-like generally continuous support layer which is transversely pleated into at least two pleats having their ridges and valleys extending lengthwise of the filament or fibre with the spacing between adjacent pleats being up to about 100µ, and in nesting relation with such pleated support layer at least one layer of generally disrupted polymeric fibres.

References Cited

UNITED STATES PATENTS 3,402,097   9/1968   Knudsen et al. _____ 161—177

ALFRED L. LEAVITT, Primary Examiner

R. A. DAWSON, Assistant Examiner

U.S. Cl. X.R.

161—128, 129, 173, 175; 264—171, 174